(12) United States Patent
Yamamoto et al.

(10) Patent No.: US 7,491,909 B2
(45) Date of Patent: Feb. 17, 2009

(54) PULSED LASER PROCESSING WITH CONTROLLED THERMAL AND PHYSICAL ALTERATIONS

(75) Inventors: Tadashi Yamamoto, Fremont, CA (US); Donald J. Harter, Ann Arbor, MI (US); Rajesh S. Patel, Fremont, CA (US); Alan Y. Arai, Fremont, CA (US)

(73) Assignee: IMRA America, Inc., Ann Arbor, MI (US)

( * ) Notice: Subject to any disclaimer, the term of this patent is extended or adjusted under 35 U.S.C. 154(b) by 74 days.

(21) Appl. No.: 10/813,389

(22) Filed: Mar. 31, 2004

(65) Prior Publication Data

US 2005/0218122 A1     Oct. 6, 2005

(51) Int. Cl.
*B23K 26/38* (2006.01)

(52) U.S. Cl. .................... 219/121.61; 219/121.68; 219/121.69

(58) Field of Classification Search ............ 219/121.61, 219/121.76, 121.77, 121.68, 121.69; 438/487
See application file for complete search history.

(56) References Cited

U.S. PATENT DOCUMENTS

| | | | |
|---|---|---|---|
| 4,306,771 A | 12/1981 | Bjorklund | |
| 5,539,764 A | 7/1996 | Shields | |
| 5,656,186 A | 8/1997 | Maourou et al. | |
| 5,719,372 A | 2/1998 | Togari et al. | |
| 5,720,894 A | 2/1998 | Neev | |
| 5,742,634 A | 4/1998 | Rieger | |
| 5,756,924 A | 5/1998 | Early | |
| 5,761,111 A | 6/1998 | Glezer | |
| 5,790,574 A | 8/1998 | Rieger | |
| 5,911,891 A * | 6/1999 | Dulaney et al. | 219/121.85 |
| 6,324,195 B1 | 11/2001 | Suzuki et al. | |
| 6,399,914 B1 * | 6/2002 | Troitski | 219/121.69 |
| 6,462,307 B1 * | 10/2002 | Hennig et al. | 219/121.77 |
| 6,541,731 B2 | 4/2003 | Mead et al. | |
| 6,552,301 B2 | 4/2003 | Herman et al. | |
| 6,574,250 B2 * | 6/2003 | Sun et al. | 219/121.69 |
| 6,664,498 B2 * | 12/2003 | Forsman et al. | 219/121.6 |
| 6,727,458 B2 | 4/2004 | Smart | |
| 6,809,291 B1 * | 10/2004 | Neil et al. | 219/121.68 |
| 6,879,605 B2 | 4/2005 | Kyusho | |
| 2002/0097761 A1 * | 7/2002 | Sucha et al. | 372/30 |
| 2002/0125227 A1 * | 9/2002 | Sun et al. | 219/121.61 |

(Continued)

FOREIGN PATENT DOCUMENTS

EP     1260838 A2 *  11/2002

(Continued)

OTHER PUBLICATIONS

Translation of EP 1,260,838 A2 , Translated by McElroy Translation Company for the U.S. Patent and Trademark Office on May 2007.*

(Continued)

*Primary Examiner*—Geoffrey S Evans
(74) *Attorney, Agent, or Firm*—Sughrue Mion, PLLC

(57) ABSTRACT

A method for laser machining of material using a burst comprised of laser pulses. The method tailors the pulse width, pulse separation duration, wavelength and polarization of the multiple laser pulses included in a burst to maximize the positive effect of thermal and physical changes achieved by previous pulses that have impinged upon the machined material.

56 Claims, 7 Drawing Sheets

U.S. PATENT DOCUMENTS

| | | | |
|---|---|---|---|
| 2002/0137311 A1* | 9/2002 | Timans | 438/487 |
| 2002/0167581 A1 | 11/2002 | Cordingley et al. | |
| 2003/0151033 A1 | 8/2003 | Shepherd et al. | |
| 2003/0151053 A1 | 8/2003 | Sun et al. | |
| 2003/0196995 A1* | 10/2003 | Jennings | 438/487 |
| 2003/0205561 A1* | 11/2003 | Iso | 219/121.76 |
| 2003/0216012 A1* | 11/2003 | Sasaki et al. | 438/487 |
| 2004/0134896 A1* | 7/2004 | Gu et al. | 219/121.61 |
| 2004/0214411 A1* | 10/2004 | Yamazaki et al. | 438/487 |
| 2005/0041976 A1 | 2/2005 | Sun et al. | |
| 2005/0067388 A1* | 3/2005 | Sun et al. | 219/121.61 |
| 2005/0073689 A1* | 4/2005 | Pang et al. | 356/450 |
| 2006/0131288 A1* | 6/2006 | Sun et al. | 219/121.69 |
| 2006/0192845 A1* | 8/2006 | Cordingley et al. | 347/252 |

FOREIGN PATENT DOCUMENTS

| | | |
|---|---|---|
| JP | 2001-326190 A * | 11/2001 |
| WO | WO 2004-107510 A2 | 12/2004 |

OTHER PUBLICATIONS

'Ultrafast pulse train micromachining', Ihtesham H. Choedhury, et al, Spie Proceedings, vol. 4978 (2003) pp. 138-146.

'Laser-induced breakdown spectroscopy of steel samples using multiple Q-switch Nd:YAG laser pulses', R. Sattmann et al., J. Phys. D: Appl. Phys. 28, (1995) p. 2181-2187.

* cited by examiner

Ablated copper as a function of pulse energy of pulse 1 in FIG. 2A.

Ablated materials and recast layer as a function of separation distance of two pulses in FIG. 2A.

PULSED LASER PROCESSING WITH CONTROLLED THERMAL AND PHYSICAL ALTERATIONS

CROSS-REFERENCES TO RELATED APPLICATIONS

This application is related to the following co-pending and commonly-assigned patent applications:

Application Ser. No. 10/813,163, entitled "MODULAR FIBER-BASED CHIRPED PULSE AMPLIFICATION SYSTEM," filed on same date herewith, the disclosure of which is hereby incorporated by reference;

Application Ser. No. 10/813,173, entitled "METHOD AND APPARATUS FOR CONTROLLING AND PROTECTING PULSED HIGH POWER FIBER AMPLIFIER SYSTEMS," filed on same date herewith, the disclosure of which is hereby incorporated by reference;

Application Ser. No. 10/813,269, entitled "FEMTOSECOND LASER PROCESSING SYSTEM WITH PROCESS PARAMETERS, CONTROLS AND FEEDBACK," filed on same date herewith, the disclosure of which is hereby incorporated by reference;

Application Ser. No. 10/813,161, entitled "ETCHED PLATE ALIGNMENT METHOD," filed on same date herewith, the disclosure of which is hereby incorporated by reference.

BACKGROUND OF THE INVENTION

1. Technical Field of the Invention

The present invention relates to high-speed precision laser processing of target materials without damaging the region surrounding the cut or modified portion. More specifically, the present invention relates to a pulsed laser micromachining method to ablate or modify a portion of a structure comprised of single or multi-layer thin films. The pulsed laser beam vaporizes a portion of a layered structure comprised of metal, semiconductor material, organic material and/or dielectric material. Electrically conductive thin film links (e.g., copper, aluminum or platinum) and resistive films (e.g., nichrome, tantalum nitride, cesium silicide or silicon chromide) can be modified using the pulsed laser beam.

In an embodiment of the present invention, the metal interconnections in a LSI circuit or the metal links in a memory device (e.g., DRAM and SRAM) can be precisely severed, without damage to the layer beneath the severed portion or collateral damage to the region of the severed portion. In another embodiment of the present invention, micro- and nano-scale semiconductor devices, optical devices and microelectromechanical (MEMS) devices can be machined. In another embodiment of the present invention, biological tissues, artificial tissues and synthetic tissues can be ablated, incised, removed or fused with great precision.

2. Description of the Related Art

The demand for producing small scale features in MEMS, semiconductor, biomedical and other industries has led to the development of very precise laser material processing methods. The precise tuning and manipulation of laser pulse parameters is one method of achieving the precise control required for small scale feature manufacturing.

In some situations, it is crucial that only the region of interest in the processed material is modified, without damage to the surrounding region and/or without change to the physical, mechanical and/or chemical properties of the surrounding region. In addition, the surrounding region must remain in physical and chemical coherency with the region of interest after the laser irradiation so as to avoid induced cracks or defects in the surrounding region. Careful manipulation of laser parameters is necessary to achieve such results.

The fundamental mechanism of laser-matter interaction depends on basic laser parameters, such as pulse energy, pulse width, wavelength, pulse shape and polarization. It is well known that ultrashort pulse lasers that deliver laser pulses having pulse width of less than 100 picoseconds remove material more precisely and cleanly than laser pulses having longer pulse widths (i.e., nanoseconds). It is also known that the material breakdown threshold fluence is more precisely defined with pulse widths in the femtosecond and picosecond range, as compared to longer pulse widths. Only the laser energy above the threshold fluence contributes to the damage. In addition, most of the laser energy dissipation is confined to the irradiated region, minimizing thermal, physical and chemical damage in depth and collateral dimensions.

Breakdown or damage caused by a laser pulse includes any changes caused by electronic change, structural change and/or disintegration from the normal state of material at the ambient temperature. These changes can include dielectric breakdown, plasma formation, ablation, melting and vaporization during laser material interaction. Since ultrashort laser pulses offer a precise control of ablation threshold, precise control of the amount of material removed during materials processing is achieved with minimal debris and heat affected zone.

FIG. 1A is a schematic diagram that depicts a portion of a memory link 12 in a memory chip. FIGS. 1B and 1C are cross-sectional views of the memory link 12. The memory link 12 comprises conductive materials such as metal, polysilicon and polysilicide. The memory link 12 adheres to the passivation layer 11 (e.g., $SiO_2$) on a silicon substrate 10. The passivation layer 11 thickness is typically 0.01 to 5 microns. The memory link 12 is interconnected with other portions of the memory chip by an electrical contact 13. Typically, the memory link 12 is 0.01 to 3 microns thick and 0.1 to 3.0 microns wide. Each link is spaced apart from each other link by about 1 to 5 microns on the silicon wafer. The typical metal link materials are copper, aluminum, gold, silver, nickel, platinum, titanium and tungsten. Other electrically conductive materials are also used.

Laser spot 14 covers the link 12 and preferably, the laser spot size is 10 to 50 percent larger than the width of the link. The link 12 has to be cut without damage to the surrounding and underlying regions. Laser pulse shape, repetition rate and wavelength have to be designed so as not to cause any damage to the vicinity of the metal link.

Conventional memory link cuts employed a single pulse of a nanosecond pulse width in the IR wavelength range. U.S. Pat. No. 5,265,114 and U.S. Pat. No. 5,569,398 emphasize the importance of wavelength, where an infrared laser beam in the wavelength range of 1.2-3.0 microns is utilized. In this wavelength range, silicon is essentially transparent and absorption contrast of the link material and the silicon is maximized. This results in the selective vaporization of metal links on top of the silicon and reduction of damage to the underlying silicon wafer.

U.S. Pat. No. 5,208,437 discloses a sub-picosecond pulse for cutting aluminum interconnects without damaging the vicinity of the cut portion. The laser pulse passes away before melting of the first layer of metal starts and does not reach the layer beneath the first layer of metal.

U.S. Pat. No. 6,574,250 discloses a train of pulses in a burst of duration shorter than 1000 nanoseconds, or more preferably, 300 nanoseconds. Each set of pulse trains contains short pulses of 100 femtoseconds to 30 nanoseconds. The number of short pulses in a burst and energy of each pulse are selected so as to cleanly remove the bottom of the cut link.

U.S. Reissue Pat. No. RE37585E discloses a laser pulse that has a pulse width less than the value determined by the distinct change in the relationship of fluence breakdown threshold energy versus laser beam pulse width.

U.S. Pat. No. 6,281,471 B1 discloses a square shaped pulse of specific range of rise time, duration and fall time. The rise time of about one nanosecond is fast enough to couple the laser energy to the target materials. The pulse duration is about 2-10 nanoseconds and long enough to process the target materials. The fall time is a few nanoseconds and is rapid enough to avoid undesirable thermal effect on the structure.

SUMMARY OF THE INVENTION

The invention has been made in view of the above circumstances and has an object to overcome the above problems and limitations of the prior art, and provides methods of materials processing using bursts of laser light comprised of ultrashort pulses in the femtosecond, picosecond and nanosecond ranges, wherein parameters of the pulses comprising the burst, such as pulse width, pulse separation duration, pulse energy, wavelength and polarization, are manipulated to induce desirable properties in the processed material.

While a precise and controlled removal of material is achieved using ultrashort pulses, there are situations when having a small amount of thermal effect retained by the material from the previous pulse prior to being irradiated by a subsequent ultrashort pulse is beneficial. In addition, it is well known that the properties of most materials have some dependence on temperature. For example, the absorption of light by silicon is very dependent on temperature. Hence, heating such a target material can help initiate the ablation process at lower threshold fluence and may produce a smoother surface. In general, the thermal and physical effect or any change in structure caused by the prior pulse influences the laser matter interaction with the next pulse.

The ablation threshold energy density, as a function of pulse width, can vary significantly from the square root of t as pulse widths enter the femtosecond range. These ultrashort pulses can be used to micro-machine cleanly without causing significant heat. These ultrashort pulses also have deterministic thresholds compared to the statistical thresholds of longer pulses.

The present invention micro-machines with bursts of pulses having pulse shapes that cannot be quantified by a single pulse width in order to describe their micro-machining properties. For example, a burst comprises a 100 femtosecond pulse and a one nanosecond pulse, where the one nanosecond pulse contains ninety percent of the energy and the 100 femtosecond pulse contains ten percent of the energy. The threshold for ablation of gold is a little over 0.3 $J/cm^2$ for the 100 femtosecond pulse and 3.0 $J/cm^2$ for the one nanosecond pulse. Thus, if the burst is focused to output 0.3 $J/cm^2$, then ablation will occur during the 100 femtosecond pulse, and not during the one nanosecond pulse. If the one nanosecond pulse impinges upon the surface first, it will have no affect while the 100 femtosecond pulse will ablate. Thus, the one nanosecond predominant pulse will not leave a heat affected zone. However, if the 100 femtosecond pulse is right before the one nanosecond pulse, then the 100 femtosecond pulse will change the absorption properties of the material so the one nanosecond pulse will also interact with the material. In this case, the ablation process would be predominantly heat related. If the one nanosecond pulse is increased to 100 nanoseconds, then the pulse energy content in the long pulse can be increased by ten-fold but the threshold is still determined by the ultrashort pulse and remains fixed even with one percent of the total energy in the ultrafast pulse.

Thus, the present invention performs micro-machining where the threshold does not follow the typical square root of t prediction, but is still partially thermal in nature. The advantage is that the ultrashort pulse removes the statistical nature of ablation from the longer pulse ablation and makes the threshold deterministic.

For example, consider a burst comprising a twenty picosecond pulse that has twenty-five percent of the total energy and a 100 femtosecond pulse that has seventy-five percent of the total energy, with the energy of the 100 femtosecond pulse being 0.3 $J/cm^2$. If the twenty picosecond pulse is first, then it will not ablate the material and the ablation will be entirely from the 100 femtosecond pulse. If the 100 femtosecond pulse is first, there will be an additional interaction with the twenty picosecond pulse that will be heat related. It has been shown that an ultrafast pulse can affect the absorption of a subsequent ultrafast pulse so long as they are separated by less than ten microseconds.

Thus, in one embodiment of the present invention, the long pulse is before the ultrafast pulse if the pulse repetition rate is substantially greater than or equal 100 kilohertz. In another embodiment of the present invention, a portion of the long pulse follows after the ultrafast pulse, and adding a pedestal on the short pulse can create the long pulse. Micro-machining can be accomplished with an ultrashort pulse, where substantial energy is in a long pulse pedestal (>ten picoseconds) and where the long pulse pedestal adds a thermal machining mechanism.

The present invention performs laser machining on material using a burst of ultrashort laser pulses and tailors the pulse width, pulse separation duration, wavelength and polarization to maximize the positive effect of thermal and physical changes achieved by the previous pulse on the laser matter interaction in a burst-machining mode. Better processing results can be achieved by manipulating the pulse width, the pulse separation duration and the pulse energies of pulses within a burst. The wavelength and polarization of a laser beam also strongly affect the absorption of the laser beam, and have to be varied pulse-to-pulse in a burst in order to produce maximum laser-matter interaction.

Besides the methods of manipulating laser beam parameters described above to achieve desired results, the present invention also includes methods to achieve the thermal and physical enhancement of a material during laser processing. In an embodiment of the present invention, the background light (commonly referred to as Amplified Spontaneous Emission (ASE)) is controlled to provide a constant source of energy for achieving thermal and physical changes to enhance the machining by individual ultrashort pulses. ASE is often emitted simultaneously and co-linearly with the ultrashort pulse from an amplified fiber laser. Unlike conventional solid-state lasers, the beam profile of the ASE can match that of the ultrashort pulses. There are a number of ways to change the ASE ratio in the laser. Examples are changing the ultrashort pulse input energy into the amplifier, changing its center wavelength or changing the diode pump power to the amplifier. Another means more variable is within the compressor of the laser. As disclosed in Application Ser. No. 10/813,163, entitled "MODULAR FIBER-BASED CHIRPED PULSE AMPLIFICATION SYSTEM," filed on same date herewith, the disclosure of which is hereby incorporated by reference, the spectral output of the ASE can be designed to be at a different wavelength then that of the ultrashort pulse. Thus, in the compressor, where the spectral components are physically separated, a component can be placed to block or partially block the ASE, as disclosed in Application Ser. No. 10/813,163. The ratio between the ASE and the ultrashort pulse energy can be controlled to vary the amount of preheating applied to the target material. In another embodiment of the invention, a pedestal of an ultrashort pulse is controlled. The pedestal is similar to a superimposed long-pulse with lower amplitude.

The invention is based on the interaction with a material of laser pulses of different pulse widths, pulse separation duration, energy, wavelength and polarization in a burst mode. The positive aspects of pulses having different pulse widths, pulse separation duration, energies, wavelengths and polarization are utilized, and a negative aspect of one pulse complements a positive aspect of another pulse. The coupling of laser energy during interaction of successive laser pulses with a material induces various thermal, physical and chemical couplings. The induced coupling involves microscopic change of electronic structure, phase transition, structural disintegration and/or other physical changes. For example, pulses with different pulse widths in a burst induce coupling that is different from a burst having pulses with the same pulse width.

A first aspect of the invention provides a method of materials processing using laser light. The method comprises applying bursts of laser light to a target area of a material at a predetermined repetition rate. Preferably, the burst repetition rate is substantially equal to or greater than 100 kilohertz, although lower repetition rates can be used. The burst of laser light comprises a first pulse and a second pulse of laser light displaced in time, although more pulses could be used in the burst as necessary. The first pulse has a first pulse width and the second pulse has a second pulse width, and the first pulse width is greater than the second pulse width. The first pulse width is generally in the nanosecond range, and the second pulse width is generally in the picosecond to femtosecond range. Other parameters of the first and second pulses, such as pulse energy, pulse wavelength, pulse separation duration and pulse polarization vector, are controlled as well to machine the target area of the processed material.

A second aspect of the present invention provides a method of materials processing that is similar to the first aspect, except that the first and second pulses of the burst of laser light are overlapped in time, instead of being displaced in time. More pulses could be used in the burst as necessary. The first pulse has a first pulse width and the second pulse has a second pulse width, and the first pulse width is greater than the second pulse width. The first pulse width is generally in the nanosecond range, and the second pulse width is generally in the picosecond to femtosecond range. Other parameters of the first and second pulses, such as pulse energy, pulse wavelength, pulse separation duration and pulse polarization vector, are controlled as well to machine the target area of the processed material. In addition, the second pulse may include a pedestal to facilitate thermally heating the processed material.

A third aspect of the present invention provides a method of materials processing using laser light. The method comprises applying bursts of laser light to a target area of a material at a predetermined repetition rate. Preferably, the burst repetition rate is substantially equal to or greater than 100 kilohertz, although lower repetition rates can be used. The burst of laser light comprises a first pulse and a second pulse of laser light displaced in time, although more pulses could be used in the burst as necessary. The first pulse has a first pulse width, and predetermined parameters of the first pulse are selected to induce a change in a selected property of the processed material. The second pulse has a second pulse width, and predetermined parameters of the second pulse are selected based upon the property change induced by the first pulse. The first pulse width is generally in the nanosecond range, and the second pulse width is generally in the picosecond to femtosecond range. Predetermined parameters include pulse energy, pulse wavelength, pulse separation duration and pulse polarization vector.

A fourth aspect of the present invention provides a method of materials processing that is similar to the third aspect, except that the first and second pulses of the burst of laser light are overlapped in time, instead of being displaced in time. More pulses could be used in the burst as necessary. The first pulse has a first pulse width and the second pulse has a second pulse width, and the first pulse width is greater than the second pulse width. The first pulse has a first pulse width and predetermined parameters of the first pulse are selected to induce a change in a selected property of the processed material. The second pulse has a second pulse width, and predetermined parameters of the second pulse are selected on based upon the property change induced by the first pulse. The first pulse width is generally in the nanosecond range, and the second pulse width is generally in the picosecond to femtosecond range. Predetermined parameters include pulse energy, pulse wavelength, pulse separation duration and pulse polarization vector.

A fifth aspect of the present invention provides a laser apparatus that applies bursts of laser light to a target area of a material at a predetermined repetition rate. Preferably, the burst repetition rate is substantially equal to or greater than 100 kilohertz, although lower repetition rates can be used. The burst of laser light comprises first and second pulses of laser light displaced in time, although additional pulses can be included in the burst. The first pulse emitted by the laser apparatus has a first pulse width and the second pulse emitted by the laser apparatus has a second pulse width, and the first pulse width is greater than the second pulse width. The first pulse width is generally in the nanosecond range, and the second pulse width is generally in the picosecond to femtosecond range. Other parameters of the first and second pulses, such as pulse energy, pulse wavelength, pulse separation duration and pulse polarization vector, are controlled as well to machine the target area of the processed material.

A sixth aspect of the present invention provides a laser apparatus that that is similar to the fifth aspect, except that the first and second pulses of the burst of laser light are overlapped in time, instead of being displaced in time. Preferably, the burst repetition rate is substantially equal to or greater than 100 kilohertz, although lower repetition rates can be used. Additional pulses can be included in the burst. The first pulse emitted by the laser apparatus has a first pulse width and the second pulse emitted by the laser apparatus has a second pulse width, and the first pulse width is greater than the second pulse width. Other parameters of the first and second pulses, such as pulse energy, pulse wavelength, pulse separation duration and pulse polarization vector, are controlled as well to machine the target area of the processed material. The first pulse width is generally in the nanosecond range, and the second pulse width is generally in the picosecond to femtosecond range.

A seventh aspect of the present invention provides a laser apparatus for materials processing, which applies bursts of laser light to a target area of a material at a burst repetition rate that is substantially equal to or greater than 100 kilohertz, although lower repetition rates can be used. The burst of laser light comprises first and second pulses of laser light displaced in time, wherein the first pulse emitted by the laser apparatus has a first pulse width and the second pulse emitted by the laser apparatus has a second pulse width. Predetermined parameters of the first pulse, such as pulse energy, pulse wavelength, pulse separation duration and pulse polarization vector, induce a change in a selected property of the material, and predetermined parameters of the second pulse interact with the property change induced by the first pulse. The first pulse width is generally in the nanosecond range, and the second pulse width is generally in the picosecond to femtosecond range.

An eighth aspect of the present invention provides a laser apparatus for materials processing, which applies bursts of laser light to a target area of a material at a burst repetition rate that is substantially equal to or greater than 100 kilohertz, although lower repetition rates can be used. The burst of laser light includes first and second pulses of laser light that are overlapped in time. The first pulse emitted by the laser apparatus has a first pulse width and the second pulse emitted by the laser apparatus has a second pulse width. Predetermined parameters of the first pulse, such as pulse energy, pulse wavelength, pulse separation duration and pulse polarization vector, induce a change in a selected property of the material, and predetermined parameters of the second pulse interact with the property change induced by the first pulse. The first pulse width is generally in the nanosecond range, and the second pulse width is generally in the picosecond to femtosecond range.

Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

DESCRIPTION OF THE PREFERRED EMBODIMENTS

A detailed description of the preferred embodiments of the invention will now be given referring to the accompanying drawings.

Laser welding of transparent materials is an application relatively well suited for ultrafast lasers. This is an application that can also benefit from a multiple pulse source. Current techniques for laser welding of transparent materials involve the deposition or placement of an absorbing material underneath a transparent material to allow for heat to be transferred from a laser source (typically a long pulse near-IR system) to the weld zone. This is required since linear absorption is not available as a heat source during laser propagation through transparent media. Femtosecond lasers provide a solution, since it is possible to couple heat from the laser to a transparent substrate via non-linear absorption. However, this technique has not been used in practice because the window between heating/melting and material ablation is very narrow, and thus requires precise control of laser processing parameters.

The present invention uses specifically arranged multiple pulses in a burst to induce strong coupling among the pulses to facilitate accurate and high-speed materials processing as a result of laser-matter interaction. The present invention allows for precise cutting without risk of damage to the surrounding materials. The present invention provides for user control of laser processing parameters, and, in particular, control of the rate of heat deposition (through burst machining, with variable repetition rate and pulse duration) and accurate control of the position, size, and shape of the focused beam). The use of a multiple pulse can open up the parameter range for laser machining. First, an ultrafast pulse near the threshold of ablation causes breakdown at the interface. This pulse changes the absorption characteristics at the point that heat needs to be deposited. Next, a long pulse is used to deposit heat at the interface where welding is desired. The ultrafast pulse causes this process to become deterministic and precise at each point along the weld line. The energy in the long pulse can be changed in order to change the amount of heat deposited without adding sufficient energy and intensity to reach the breakdown threshold.

In embodiments of the invention, the following pulse properties are changed during the burst mode machining:
(1) Pulse width, pulse separation duration and pulse energy;
(2) Wavelength;
(3) Polarization.

While each of these parameters is an important factor in influencing the laser matter interaction individually, they all can be changed simultaneously to achieve the maximum effect in laser-matter interaction depending on materials and a specific application.

Figure 1A:
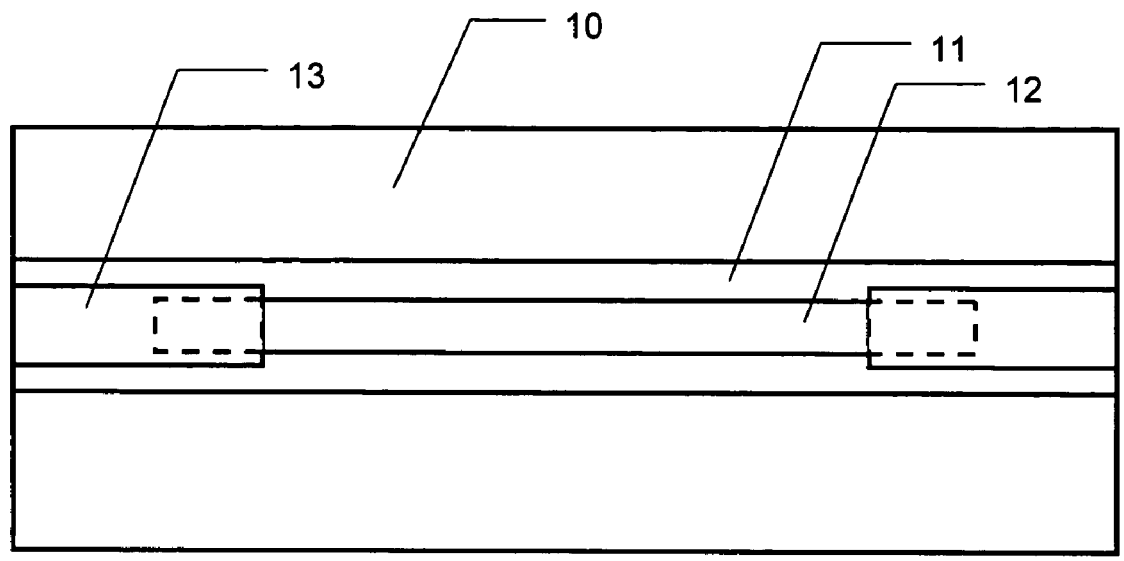
FIG. 1 are schematic and cross-sectional views of link in a memory chip.
Figure 1B:
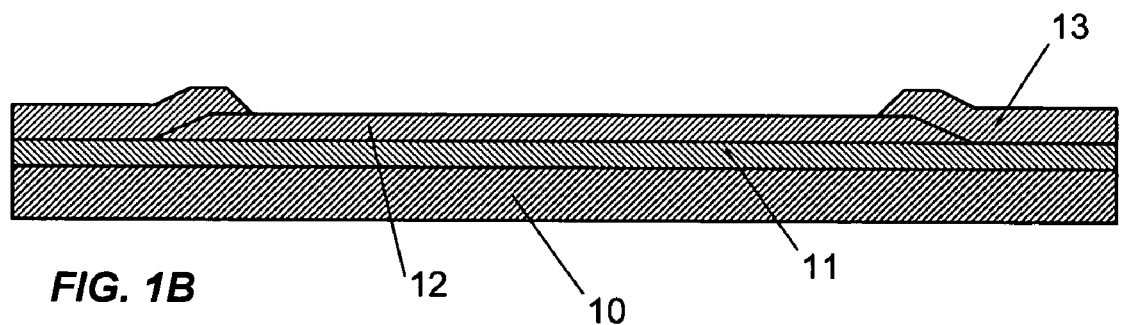
Figure 1C:
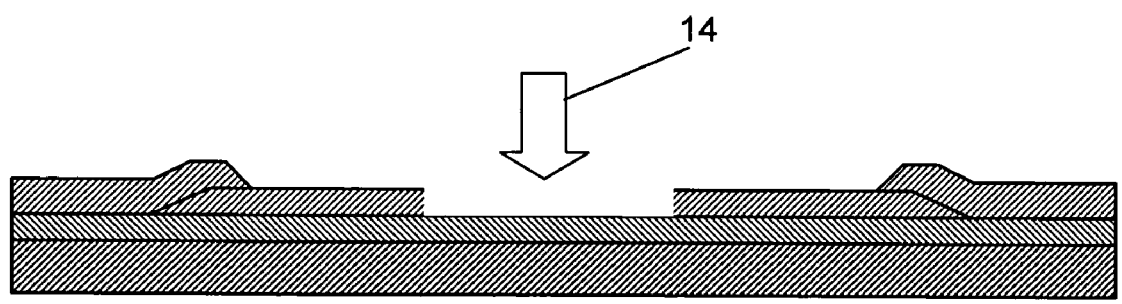
Figure 2A:
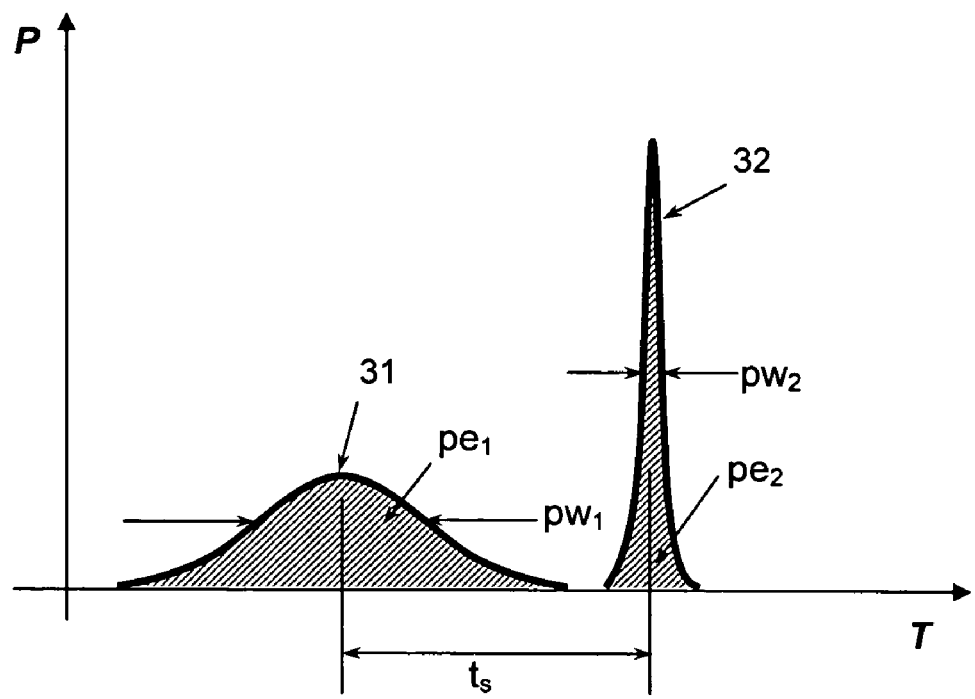
FIG. 2A illustrates a burst comprised of two laser light pulses that are separated in time.

Besides the methods of manipulating laser beam parameters described above to achieve desired results, there are additional techniques for achieving thermal and physical enhancement of material during laser processing. One method is to control the background light (referred to as Amplified Spontaneous Emission (ASE)) to provide a constant source of energy for achieving thermal and physical changes to enhance the machining by individual ultrashort pulses. Referring to FIG. 2A, the temporal arrangement of multi-pulses is depicted, where only two separated pulses that comprise a burst are illustrated for purposes of clarity. A burst might comprise more than two pulses, but, for reasons of drawing clarity, only two pulses are shown. The first pulse 31 has the parameters of pulse energy $pe_1$ and pulse width $pw_1$ and the second pulse 32 has the parameters of pulse energy $pe_2$ and pulse width $pw_2$. The pulses are separated by a time separation $t_s$. Preferably, the time separation $t_s$ has a value that is much greater than the pulse widths $pw_1$ and $pw_2$, i.e., $pw_1$ or $pw_2 << |t_s|$. Depending upon the particular application, the pulse width values for $pw_1$ and $pw_2$ may or may not be equal, and the pulse energy values for $pe_1$ and $pe_2$ may or may not be equal. The pulse width values $pw_1$ are generally in the nanosecond range, and the pulse width values for $pw_2$ are generally in the picosecond to femtosecond range.

The temporal pulse shape shown in FIG. 2A has a Gaussian shape, but it is not limited to Gaussian shapes. The pulse shape is defined more appropriately here by pulse width and peak power. The relationship of the multiple pulses is characterized by pulse width, peak power and separation time between pulses. Separation time is measured as a positive value from the center of the long pulse as a delay time after the long pulse.

The pulse shape and the location of two pulses as shown in FIG. 2A can be used as envelopes for the peaks of more than two pulses. Multiple pulses enclosed in the envelope defined by the first pulse shown in FIG. 2A will cause a similar effect. For example, a pulse shape curve of the long pulse serves as an envelope of peak power of each of the pulses enclosed within it.

Figure 3:
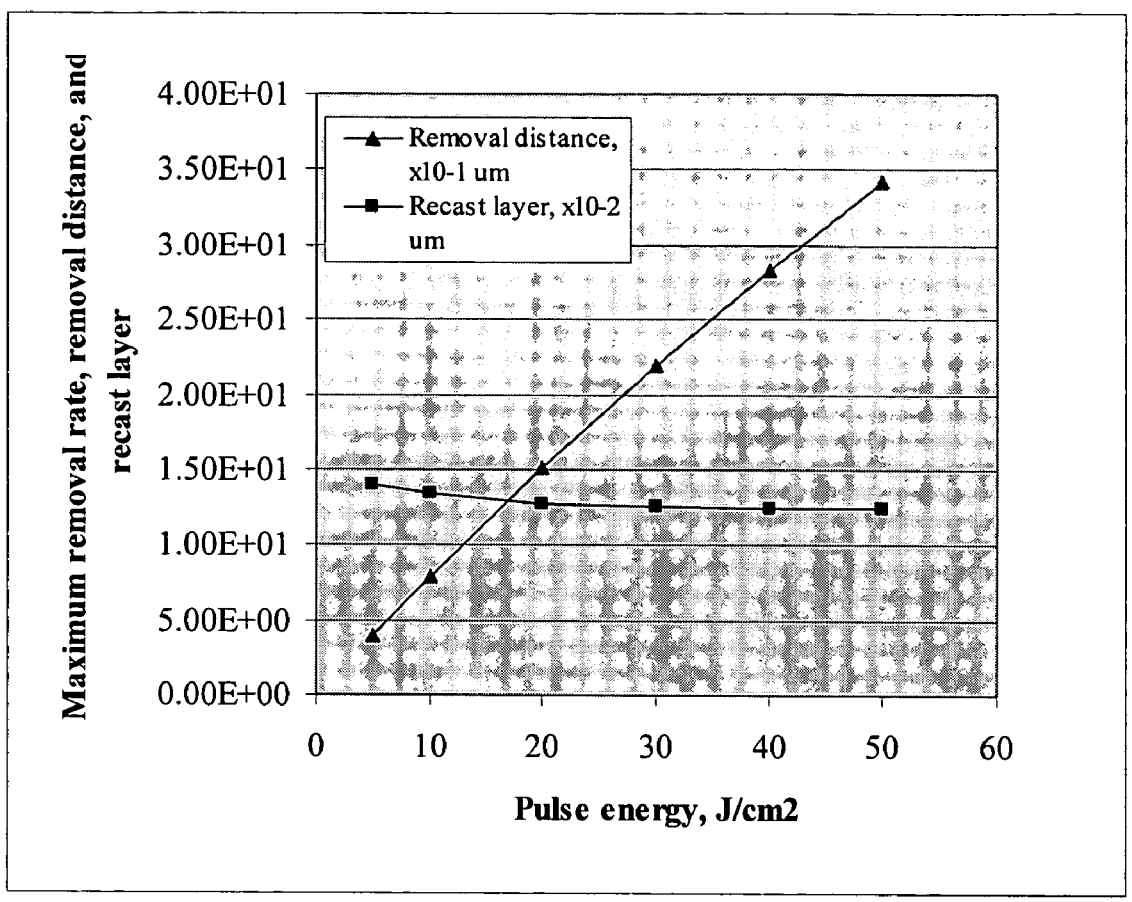
FIG. 3 illustrates the ablation of copper by a single pulse having a pulse duration of 300 picoseconds.

FIG. 3 shows an effect of laser energy of a single 300 picosecond laser pulse on the amount of ablated copper and recast layer thickness. It is observed that the ablation increases linearly to the laser pulse energy. A copper metal link of 0.5 micron thickness can be excised by a laser pulse with a fluence of about 5 J/cm$^2$. A shorter pulse width has a more peak intensity and less energy is necessary to cut the same amount of material. In FIG. 3, the recast layer thickness does not change by changing the laser energy for 300 picosecond laser pulse. However, a large reduction of recast layer is seen for the shorter pulse widths, such as 300 femtoseconds. The shorter pulse widths effectively reduce damage and thermal effects to the region surrounding the ablation.

Figure 4:
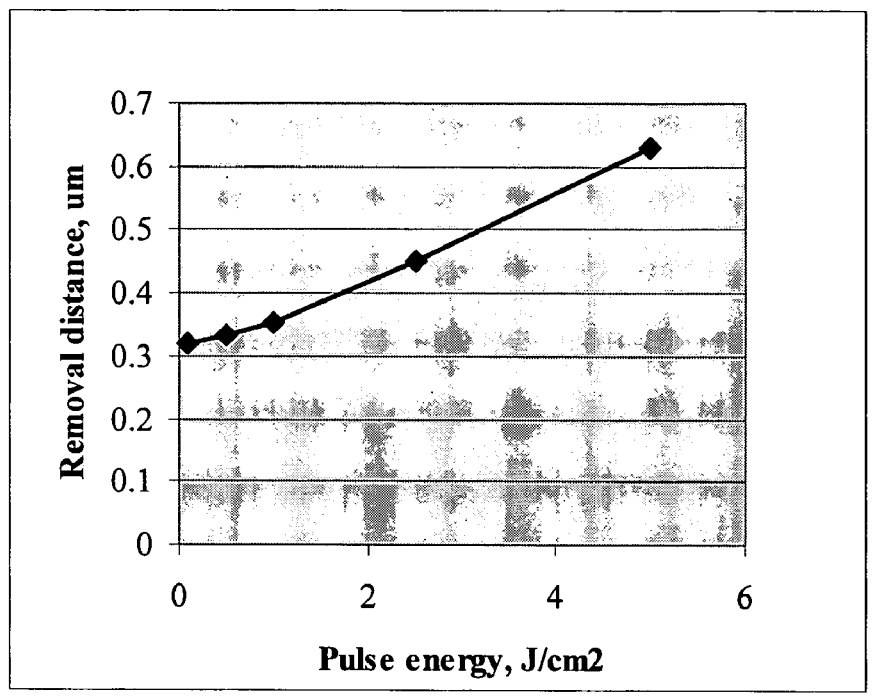
FIG. 4 illustrates ablated copper as a function of pulse energy of the first pulse depicted in FIG. 2A.

In the case of two pulses shown in FIG. 2A, the effect of fluence of the long pulse (3 nanoseconds) on ablation is shown in FIG. 4, where fluence of the longer pulse was changed while keeping the fluence of the shorter pulse (300 picosecond) constant at 5 J/cm$^2$. In this particular case, the separation distance is chosen to be zero, that is, the shorter pulse is situated at the center of the longer pulse. The effect of fluence of long pulse on the ablation is evident. More ablation is seen with increasing laser energy. This effect is observed in the wide range of separation time of any combination of short and long pulses.

Preferably, the separation time of this coupling of two pulses is between $-pw_1$ and $+pw_1$, where $pw_1$ is a pulse width of the long pulse. For example, when $pw_1=3.0$ nanoseconds, it is between $-3.0$ nanoseconds and $+3.0$ nanoseconds. The peak power of long pulse is less than that of the short pulse to avoid damage to the surrounding area by the long pulse. Energy of each pulse is between 0.0001 microjoules and 10 microjoules.

In one embodiment, energy of the long pulse is kept below damage threshold energy of a metal, while energy of short pulse is above that to cause vaporization of the metal. A passivation layer is transparent to the long pulse but the metal absorbs energy from the long pulse and is heated. The subsequently arriving short pulse with a high enough energy vaporizes the metal selectively since the metal is already heated by the long pulse.

In another embodiment, the fluence of the short pulse is chosen to lie between a damage threshold energy of a passivation layer and a damage threshold energy of a metal. For example, the damage threshold energy of aluminum is about 0.08 J/cm$^2$, and about 1 J/cm$^2$ for SiO$_2$. By choosing a fluence that lies between these two values, only metal is evaporated.

Furthermore, nonlinear absorption of high intensity laser pulses suppresses the wavelength dependency of linear absorption. In this case, controlling the material removal rate based on pulse energy is more preferable over the use of absorption contrast by wavelength.

Figure 2B:
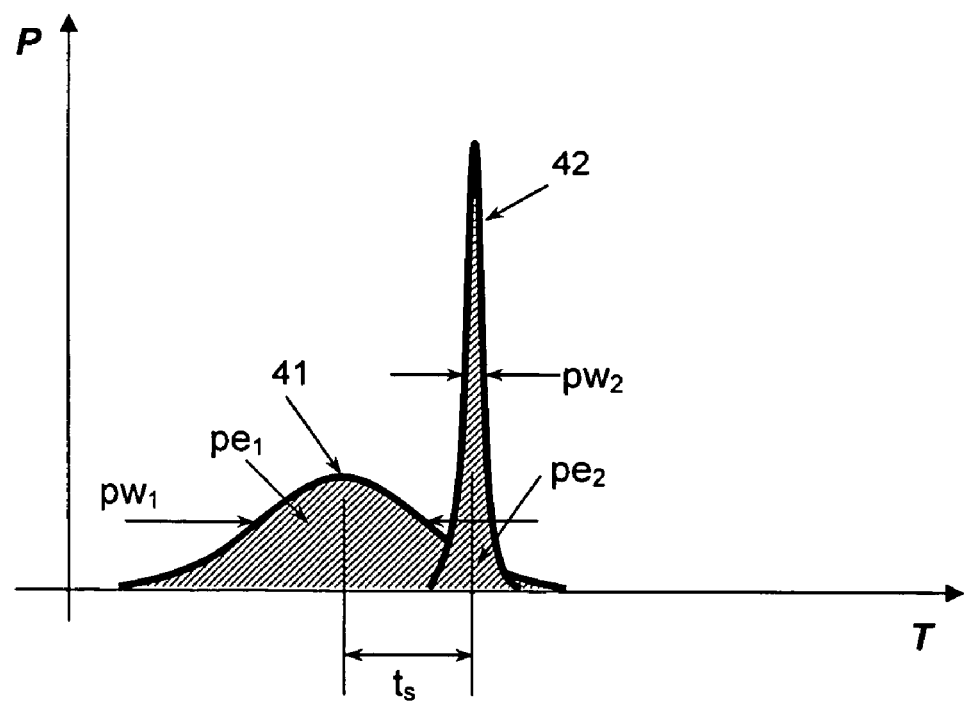
FIG. 2B illustrates a burst comprised of two laser light pulses that are overlapped.

Referring to FIG. 2B, two overlapping pulses that comprise a burst are illustrated. A burst might comprise more than two pulses, but, for reasons of drawing clarity, only two pulses are shown. The pulses 41, 42 shown in FIG. 2B are identical to pulses 31, 32 illustrated in FIG. 2A. Depending upon the particular application, the pulse width values for $pw_1$ and $pw_2$ may or may not be equal, and the pulse energy values for $pe_1$ and $pe_2$ may or may not be equal. The pulse width values $pw_1$ are generally in the nanosecond range, and the pulse width values for $pw_2$ are generally in the picosecond to femtosecond range. In this embodiment of the invention, pulses 41 and 42 overlap in time. As discussed in more detail below, pulses can be overlapped to achieve specific materials damage and/or ablation.

The effects of the parameters of pulse width, pulse separation duration and pulse energy will now be described. The present invention utilizes the degree of interaction of laser energies of the successive pulses in a burst by specifically manipulating separation distance of pulses and also by changing pulse width and energy of each pulse. In an embodiment of the present invention, coupling of successive laser pulses is used in laser matter interaction. The time separation of successive pulses (at least two pulses comprise a burst) are arranged such that these pulses either overlap each other or are close together in time. The next pulse has to arrive before any change of material (thermal or physical) caused by the prior pulse disappears. Such interaction of next pulse with the modified material helps achieve better laser energy coupling with the material. In addition, the pulse width and pulse energy are changed from pulse to pulse within a burst to achieve specific materials damage or ablation.

For example, a sequence of nanosecond, picosecond or femtosecond pulses, in any combination, is arranged in a burst mode machining. The positive aspect of any changes in the material caused by the prior laser pulse is kept, but the negative aspect of any changes is corrected by the next pulse. With a proper choice of parameters, is it also possible that the positive aspect induced by the prior pulse is further enhanced by the next pulse. By choosing separation time and pulse widths and energies of successive nanosecond and picosecond pulses properly, a picosecond pulse removes the liquid layer induced by the prior nanosecond second pulse, reducing heat affected zone, but the prolonged nanosecond pulse keeps the material warm and provides an annealing effect after the end of picosecond pulse, thereby reducing cracks. In this case, the pulse width and energy are carefully tailored as well as the pulse separation duration.

Figure 5:
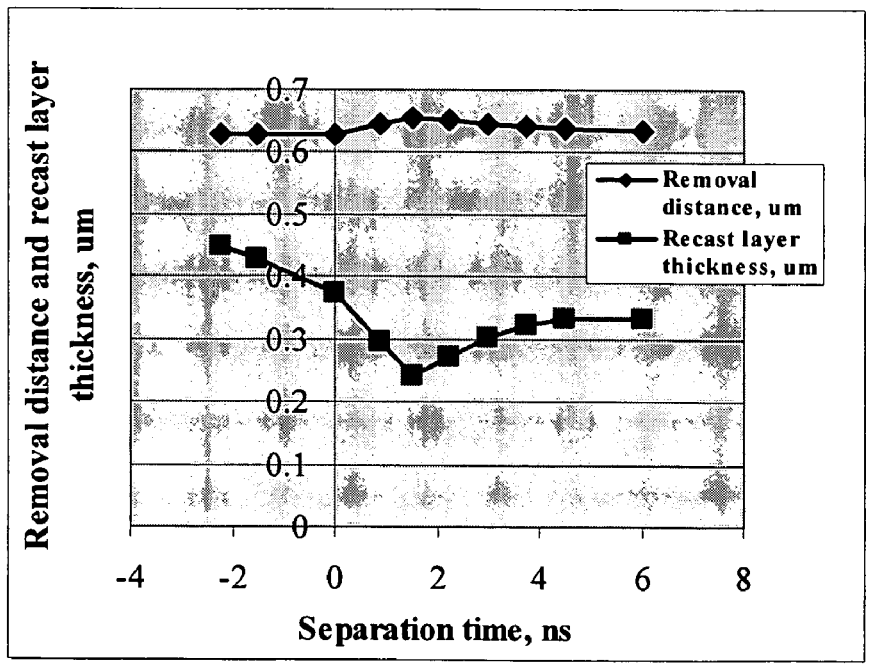
FIG. 5 illustrates ablated materials and a recast layer as a function of separation time of the two pulses depicted in FIG. 2A.

FIG. 5 illustrates the effect of separation time between a long pulse (3 nanoseconds) and a short pulse (300 picoseconds) on material removal and recast layer thickness after the single pulse ablation of copper. Both pulses have the same fluence of 5 J/cm$^2$. The minimum recast layer and maximum material removal is seen near $t_s$=1.5 nanoseconds. There is an optimum range of separation time for multi-pulse processing. In this particular case, the optimum separation time is between −3.0 and 6.0 nanoseconds. In general, optimum separation can be expressed in terms of the pulse width of the long pulse. Optimum range of separation time $t_s$ is between −1.0×$pw_1$ and +2.0×$pw_1$, where $pw_1$ is the pulse width of the long pulse. For the case of $pw_1$=1.0 nanosecond, the optimum range of $t_s$ is −1.0 nanosecond to 2.0 nanoseconds.

In the present invention, the short pulse has an effect of reducing damage to the surrounding area in the end of the burst when the short pulse is located in the prescribed range of separation time relative to the long pulse. One burst or several bursts can be used to cut the link, depending upon the laser energy of each pulse in a burst and the thickness of the link to be cut.

Figure 6A:
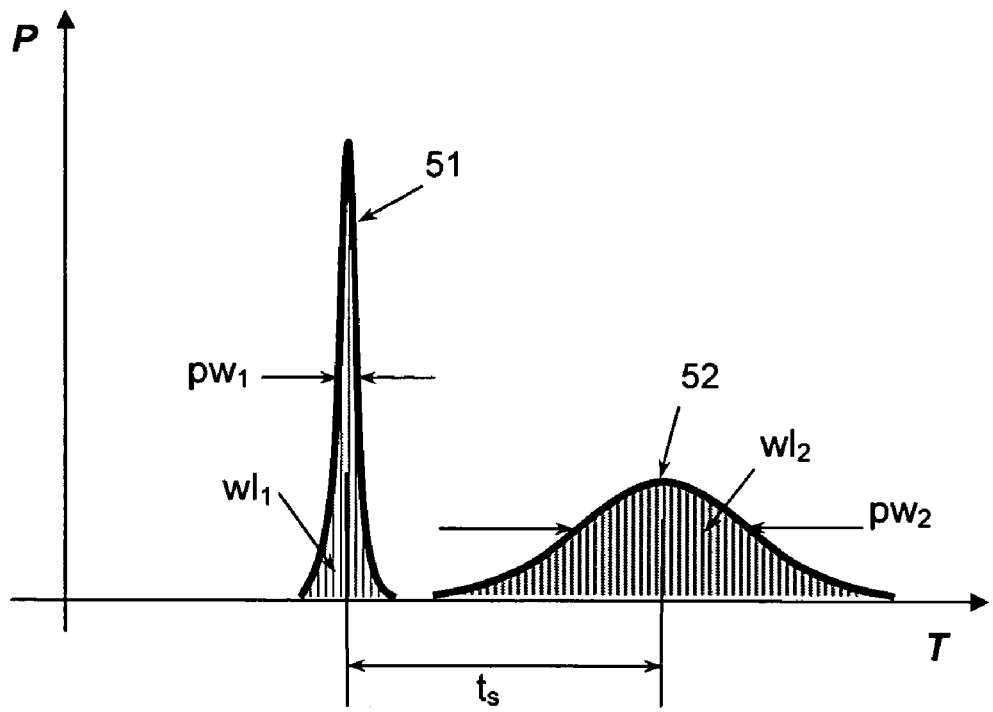
FIG. 6A illustrates burst comprised of two laser light pulses, each having a different wavelength, that are not overlapped in time.

In another aspect of the invention, the wavelength of successive pulses in a burst can be changed. Referring to FIG. 6A, two separated pulses that comprise a burst are illustrated. A burst might comprise more than two pulses, but, for reasons of drawing clarity, only two pulses are shown. The first pulse 51 has the parameters of pulse wavelength $wl_1$ and pulse width $pw_1$ and the second pulse 52 has the parameters of pulse wavelength $wl_2$ and pulse width $pw_2$. The pulses are separated by a time separation $t_s$. Preferably, the time separation $t_s$ has a value that is much greater than the pulse widths $pw_1$ and $pw_2$, i.e., $pw_1$ or $pw_2 << |t_s|$. Depending upon the particular application, the pulse width values for $pw_1$ and $pw_2$ may or may not be equal, and the pulse wavelength values for $wl_1$ and $wl_2$ are never equal. The pulse width values $pw_1$ are generally in the nanosecond range, and the pulse width values for $pw_2$ are generally in the picosecond to femtosecond range.

Figure 6B:
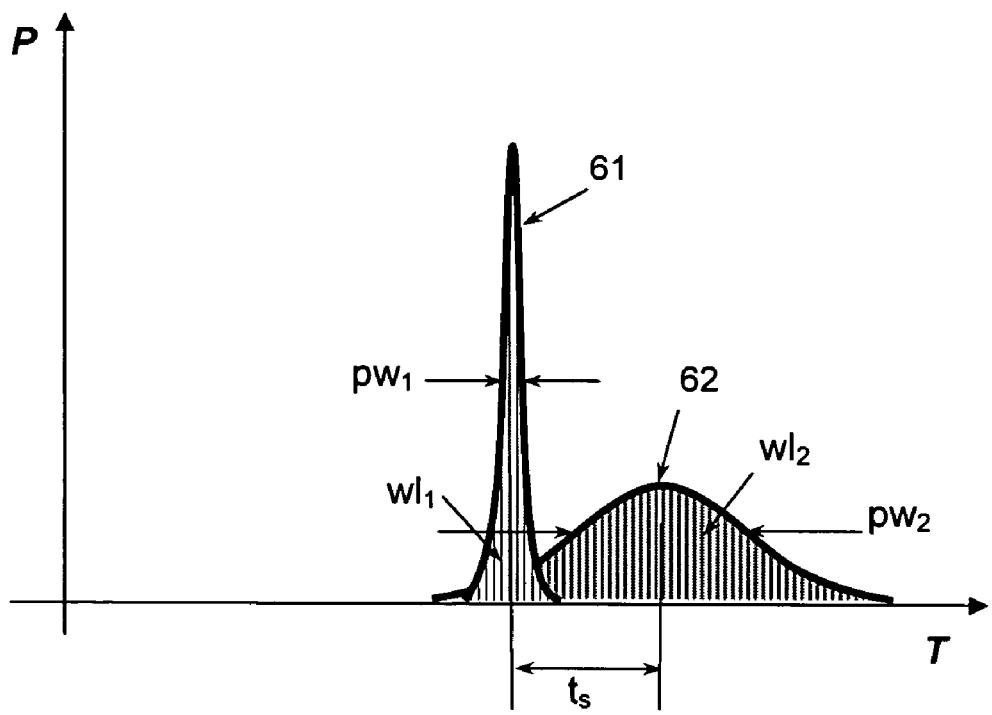
FIG. 6B illustrates a burst comprised of two laser light pulses, each having a different wavelength, that are overlapped in time.

Referring to FIG. 6B, two overlapping pulses that comprise a burst are illustrated. A burst might comprise more than two pulses, but, for reasons of drawing clarity, only two pulses are shown. The pulses 61, 62 shown in FIG. 6B are identical to pulses 51, 52 illustrated in FIG. 6A. Depending upon the particular application, the pulse width values for $pw_1$ and $pw_2$ may or may not be equal, and the wavelength values for $wl_1$ and $wl_2$ are never equal. In this embodiment of the invention, pulses 61 and 62 overlap in time. As discussed in more detail below, pulses can be overlapped to achieve specific materials damage and/or ablation.

It is well-known that the materials respond differently to the radiation of different wavelengths, and absorption of laser energy depends strongly on wavelength. A change in a material's property changes the way a material responds to laser light of a particular wavelength. The wavelength of each successive pulse in a burst is tailored to interact effectively with the material in response to the changes caused by the wavelength of the prior pulse. The wavelength of second pulse is tailored such that better coupling of the laser beam of the second pulse and the material modified by the first pulse is achieved.

As an example, in the course of successive interaction of laser pulses, a material changes its phase, wherein each phase also experiences temperature change. Each of these phases has a different response to the wavelength of the laser beam that impinges upon it. Interaction is maximized by changing the wavelength of the laser beam to the absorption wavelength of each phase occurring in time. The separation time of the successive pulse is also adjusted according to the time sequence of phase change.

The wavelength of each pulse in a burst can be changed pulse by pulse so as to cause selective energy deposition on the material by exploiting absorption contrast. For example, at wavelengths larger than 1.045 microns but below 1.20 microns, the energy of a long pulse, when it is kept low enough to cause linear absorption, can be transferred selectively to the metal link, but not to a semiconductor material, such as silicon. The energy coupling with the short pulse takes place only in the metal link. The wavelength of the short pulse does not matter when the energy of the pulse is high enough to cause nonlinear absorption, typical for the short sub-picosecond laser pulse (FIG. 6A). The selective energy coupling of laser energy of multi-pulses allows a stronger coupling of the laser pulse into metals, resulting in rapid evaporation.

The wavelength of each pulse in a burst can be varied over time. For example, the absorption of doped silicon goes up with increasing temperature and wavelength. During laser processing, the temperature of the material goes up with time. Therefore, the absorptivity increases during laser pulse irradiation. For example, if the wavelength of the first pulse is 1.5 microns, the wavelength has to be shifted to 1.4 microns, 1.3 microns, 1.2 microns, etc. in order to maintain a high absorption contrast between the silicon and metal.

The wavelength can be adjusted from a burst to a burst, where each burst cuts different thin films on a semiconductor device. For example, in the case of the coexistence of electrical conductive film such as aluminum and resistive film such as nichrome, each burst cuts these different films in succession. The wavelengths for each burst are tailored to the absorption properties of each material to be cut.

In the micro-machining of nanolayer composites or super lattice thin films, which are made up of different layer materials of different absorption edge, each pulse cuts each layer and wavelength of each pulse in a burst is chosen such that each layer absorbs laser energy efficiently.

In another example, in the course of successive interaction of laser pulses, electronic state changes in the material, especially in a transparent material where creation of free electrons by ionization, plasma formation and electron-phonon coupling has to take place in time sequence for the laser induced breakdown to happen. Electrons at each stage respond differently to the wavelength of the laser pulse. Hence, the idea is to change the wavelength of the pulses to adjust to the changing electron state to achieve the appropriate breakdown efficiently. This event takes place in less than 1 picosecond and the separation time of pulses needs to be chosen accordingly.

In another aspect of the invention, the polarization of the pulses comprising a burst is changed. Polarization of the laser pulse affects the surface structure of the modified material. For example, a linearly polarized laser beam creates a wavy pattern on the machined surface and an elliptically drilled hole. The orientation of wavy pattern depends on the direction of polarization. In some applications, the cut must be very smooth or the portion remaining after vaporization must be a smooth and flat surface (e.g., chip repair and micro-fluidic devices). Rapid rotation of the polarization direction of the laser pulse homogenizes results in a smooth surface. In another application, a wavy pattern can be made on wear resistant parts such as friction parts. In those instances, the wavy pattern can be tailored by changing the polarization direction.

Figure 7A:
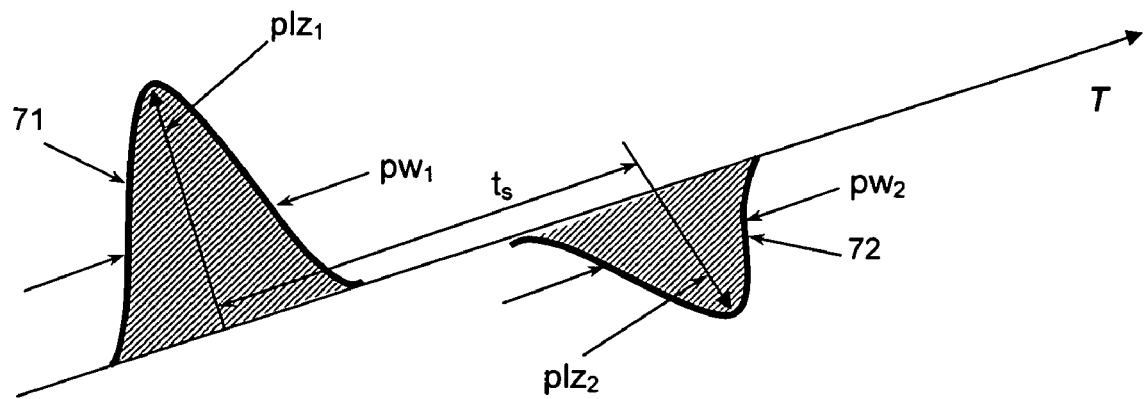
FIG. 7A illustrates a burst comprised of two laser light pulses, each having a different polarization, that are separated in time.

Referring to FIG. 7A, two pulses, separated in time, that comprise a burst are illustrated. A burst might comprise more than two pulses, but, for reasons of drawing clarity, only two pulses are shown. The first pulse 71 has the parameters of pulse polarization $plz_1$ and pulse width $pw_1$ and the second pulse 72 has the parameters of pulse polarization $plz_2$ and pulse width $pw_2$. The pulses are separated by a time separation $t_s$ (not shown). Preferably, the time separation $t_s$ has a value that is much greater than the pulse widths $pw_1$ and $pw_2$, i.e., $pw_1$ or $pw_2 << |t_s|$. Depending upon the particular application, the pulse width values for $pw_1$ and $pw_2$ may or may not be equal, and the pulse polarization values for $plz_1$ and $plz_2$ are never equal. The pulse width values $pw_1$ are generally in the nanosecond range, and the pulse width values for $pw_2$ are generally in the picosecond to femtosecond range.

Figure 7B:
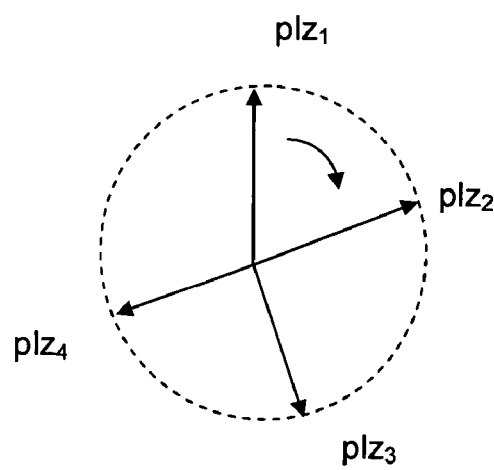
FIG. 7B illustrates the polarization of four pulses that are separated in time.

Referring to FIG. 7B, a different view of the polarization of the pulses comprising a burst is shown. The burst in FIG. 7B comprises four separate pulses, and each pulse has its own polarization value, i.e., $plz_1$, $plz_2$, $plz_3$ and $plz_4$. The four polarization factors are arranged apart from one another as shown in FIG. 7B.

Figure 8A:
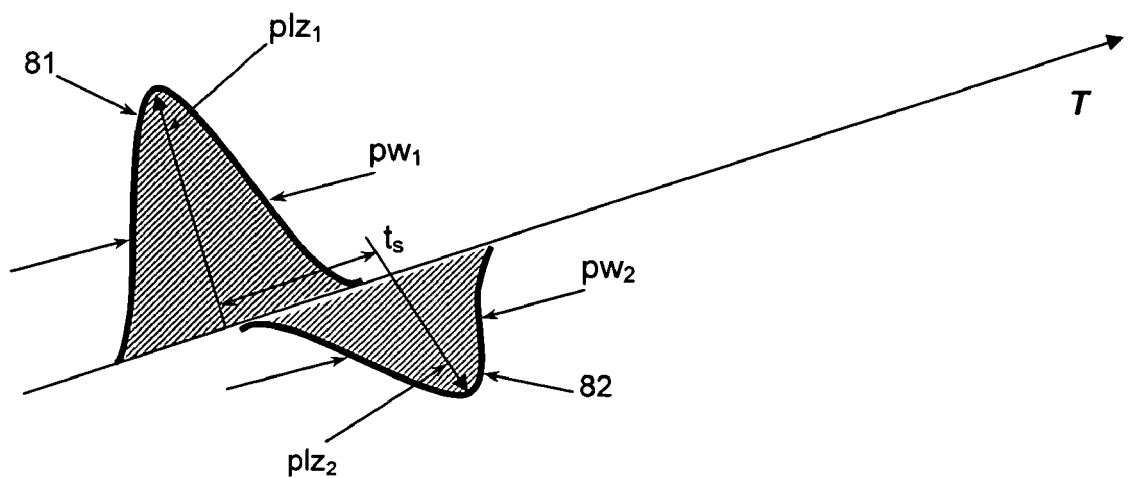
FIG. 8A illustrates a burst comprised of two laser light pulses, each having a different polarization, that are overlapped in time.

Referring to FIG. 8A, two overlapping pulses that comprise a burst are illustrated. A burst might comprise more than two pulses, but, for reasons of drawing clarity, only two pulses are shown. The pulses 81, 82 shown in FIG. 8A are identical to pulses 71, 72 illustrated in FIG. 7A. Depending upon the particular application, the pulse width values for $pw_1$ and $pw_2$ may or may not be equal, and the pulse polarization values for $plz_1$ and $plz_2$ are never equal. In this embodiment of the invention, pulses 81 and 82 overlap in time. As discussed in more detail below, pulses can be overlapped to achieve specific materials damage and/or ablation.

Figure 8B:
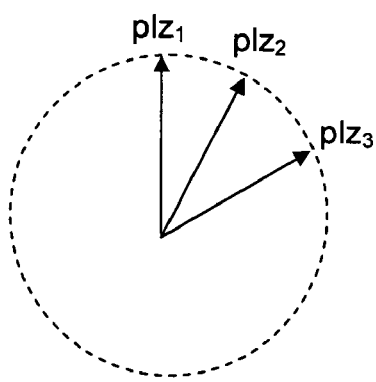
FIG. 8B illustrates the polarization of three pulses that are overlapped in time.

Referring to FIG. 8B, a different view of the polarization of the pulses comprising a burst is shown. The burst in FIG. 8B comprises three separate pulses, and each pulse has its own polarization value, i.e., $plz_1$, $plz_2$ and $plz_3$. The three polarization factors are arranged close to one another as shown in FIG. 8B.

It is well known that for a given direction of laser beam polarization, a particular texture is generated on an impinged-upon material. The polarization is changed from pulse to pulse in the same manner as described above for the wavelength in the course of electronic and physical change of material caused by the successive interaction of laser pulse with material to achieve the best result. Rapid change of polarization also homogenizes texture of the impinged-upon region. Direction of polarization is manipulated with respect to the crystal orientation to achieve maximum laser-matter interaction.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A method of materials processing, wherein the method comprises applying bursts of laser light to a target area of a material at a predetermined repetition rate, the burst of laser light comprising at least first and second pulses of laser light displaced or overlapped in time, wherein the first pulse has a first pulse width and the second pulse has a second pulse width, and the first pulse width is greater than the second pulse width, the second pulse width being about 1 picosecond or shorter, the first pulse further comprising a pedestal having sufficient energy to at least thermally heat the target area of the material.

2. The method as claimed in claim 1, wherein the first pulse has a first polarization vector and the second pulse has a second polarization vector, wherein the first polarization vector is not equal to the second polarization vector.

3. The method as claimed in claim 1, wherein the first pulse has a first wavelength and the second pulse has a second wavelength, wherein the first wavelength is not equal to the second wavelength.

4. The method as claimed in claim 1, wherein the predetermined repetition rate is substantially equal to or greater than 100 kilohertz.

5. The method as claimed in claim 1, wherein the first pulse further comprises amplified spontaneous emission having sufficient energy to thermally heat the target area of the material.

6. The method of claim 1, wherein the first pulse provides a thermal machining mechanism.

7. A method of materials processing, wherein the method comprises applying bursts of laser light to a target area of a material at a predetermined repetition rate, the burst of laser light comprising at least first and second pulses of laser light displaced or overlapped in time, wherein the first pulse has a first pulse width and the second pulse has a second pulse width, and the first pulse width is greater than the second pulse width and greater than 10 ps in duration, the second pulse width being about 1 picosecond or shorter, wherein the first pulse at least thermally heats the target area of the material.

8. The method as claimed in claim 7, wherein the first pulse has a first polarization vector and the second pulse has a second polarization vector, wherein the first polarization vector is not equal to the second polarization vector.

9. The method as claimed in claim 7, wherein the first pulse has a first wavelength and the second pulse has a second wavelength, wherein the first wavelength is not equal to the second wavelength.

10. The method as claimed in claim 7, wherein the predetermined repetition rate is substantially equal to or greater than 100 kilohertz.

11. The method as claimed in claim 7, wherein the first pulse further comprises amplified spontaneous emission having sufficient energy to thermally heat the target area of the material.

12. The method of claim 7, wherein the first pulse provides a thermal machining mechanism.

13. A method of materials processing, wherein the method comprises applying bursts of laser light to a target area of a material at a predetermined repetition rate, the burst of laser light comprising at least first and second pulses of laser light displaced or overlapped in time, wherein the first pulse has a first pulse width and the second pulse has a second pulse width, wherein predetermined parameters of the first pulse are selected to induce a change in a selected property of the material, and predetermined parameters of the second pulse are selected based upon the property change induced by the first pulse, and where the first pulse is substantially linearly absorbed and the second pulse is nonlinearly absorbed.

14. The method as claimed in claim 13, wherein the predetermined repetition rate is substantially equal to or greater than 100 kilohertz.

15. The method as claimed in claim 13, wherein the predetermined parameters of the first pulse comprise pulse width, pulse energy, pulse wavelength and pulse polarization vector and the predetermined parameters of the second pulse comprise pulse width, pulse energy, pulse wavelength and pulse polarization vector.

16. The method as claimed in claim 15, wherein the pulse wavelength of the first pulse is not equal to the pulse wavelength of the second pulse.

17. The method as claimed in claim 15, wherein the pulse polarization of the first pulse is not equal to the pulse polarization of the second pulse.

18. The method as claimed in claim 13, wherein the first pulse changes electronic properties of the processed material.

19. The method as claimed in claim 13, wherein the first pulse changes structural properties of the processed material.

20. The method as claimed in claim 13, wherein the first pulse creates a heat affected zone in the processed material and the second pulse ablates at least a portion of the heat affected zone.

21. The method as claimed in claim 13, wherein the first pulse further comprises a pedestal or amplified spontaneous emission having sufficient energy to at least thermally heat the target area of the material.

22. A method of materials processing, wherein the method comprises applying bursts of laser light to a target area of a material at a predetermined repetition rate, the burst of laser light comprising at least first and second pulses of laser light displaced or overlapped in time, wherein the first pulse has a first pulse width greater than 10 ps and the second pulse has a second pulse width about 1 picosecond or shorter, wherein predetermined parameters of the first pulse are selected to induce a change in a selected property of the material, and predetermined parameters of the second pulse are selected based upon the property change induced by the first pulse, the first pulse creating a heat affected zone in the processed material and the second pulse ablating at least a portion of the heat affected zone.

23. The method as claimed in claim 22, wherein the predetermined repetition rate is substantially equal to or greater than 100 kilohertz.

24. The method as claimed in claim 22, wherein the predetermined parameters of the first pulse comprise pulse width, pulse energy, pulse wavelength and pulse polarization vector and the predetermined parameters of the second pulse comprise pulse width, pulse energy, pulse wavelength and pulse polarization vector.

25. The method as claimed in claim 24, wherein the pulse wavelength of the first pulse is not equal to the pulse wavelength of the second pulse.

26. The method as claimed in claim 24, wherein the pulse polarization of the first pulse is not equal to the pulse polarization of the second pulse.

27. The method as claim in claim 22, wherein the first pulse changes electronic properties of the processed material.

28. The method as claimed in claim 22, wherein the first pulse changes structural properties of the processed material.

29. The method as claimed in claim 22, wherein the first pulse further comprises a pedestal or amplified spontaneous emission having sufficient energy to thermally heat the target area of the material.

30. A laser apparatus for materials processing, wherein the laser applies bursts of laser light to a target area of a material at a predetermined repetition rate, the burst of laser light comprising at least first and second pulses of laser light displaced or overlapped in time, wherein the first pulse emitted by the laser apparatus has a first pulse width and the second pulse emitted by the laser apparatus has a second pulse width, and the first pulse width is longer than the second pulse width, the second pulse width being about 1 picosecond or shorter, and only the second pulse having an energy density above an ablation threshold, of the material, wherein the first pulse emitted from the laser apparatus comprises sufficient amplified spontaneous emission to at least thermally heat the target area of the material.

31. The laser apparatus as claimed in claim 30, wherein the first pulse emitted by the laser apparatus has a first polarization vector and the second pulse emitted by the laser apparatus has a second polarization vector, wherein the first polarization vector is not equal to the second polarization vector.

32. The laser apparatus as claimed in claim 30, wherein the first pulse emitted by the laser apparatus has a first wavelength and the second pulse emitted by the laser apparatus has a second wavelength, wherein the first wavelength is not equal to the second wavelength.

33. The laser apparatus as claimed in claim 30, wherein the predetermined repetition rate is substantially equal to or greater than 100 kilohertz.

34. A laser apparatus of materials processing, wherein the laser apparatus applies bursts of laser light to a target area of a material at a predetermined repetition rate, the burst of laser light comprising at least first and second pulses of laser light displaced or overlapped in time, wherein the first pulse emitted by the laser apparatus has a first pulse width and the second pulse emitted by the laser apparatus has a second pulse width, and the first pulse width is greater than one nanosecond, the second pulse width being about 1 picosecond or shorter, wherein the first pulse emitted from the laser apparatus comprises sufficient amplified spontaneous emission to at least thermally heat the target area of the material.

35. The laser apparatus as claimed in claim 34, wherein the first pulse emitted by the laser apparatus has a first polarization vector and the second pulse emitted by the laser apparatus has a second polarization vector, wherein the first polarization vector is not equal to the second polarization vector.

36. The laser apparatus as claimed in claim 34, wherein the first pulse emitted by the laser apparatus has a first wavelength and the second pulse emitted by the laser apparatus has a second wavelength, wherein the first wavelength is not equal to the second wavelength.

37. The laser apparatus as claimed in claim 34, wherein the predetermined repetition rate is substantially equal to or greater than 100 kilohertz.

38. A laser apparatus for materials processing, wherein the laser apparatus applies bursts of laser light to a target area of a material at a predetermined repetition rate, the burst of laser light comprising at least first and second pulses of laser light displaced or overlapped in time, wherein the first pulse emitted by the laser apparatus has a first pulse width greater than 10 picoseconds and the second pulse emitted by the laser apparatus has a second pulse width less than about 1 picosecond, and wherein predetermined parameters of the first pulse induce a change in a selected property of the material, and predetermined parameters of the second pulse interact with the property change induced by the first pulse, and the first pulse is a pedestal portion of the second pulse, and wherein the first pulse emitted from the laser apparatus comprises sufficient amplified spontaneous emission to at least thermally heat the target area of the material.

39. The laser apparatus as claimed in claim 38, wherein the predetermined repetition rate is substantially equal to or greater than 100 kilohertz.

40. The laser apparatus as claimed in claim 38, wherein the predetermined parameters of the first pulse comprise pulse width, pulse energy, pulse wavelength and pulse polarization vector and the predetermined parameters of the second pulse comprise pulse width, pulse energy, pulse wavelength and pulse polarization vector.

41. The laser apparatus as claimed in claim 38, wherein the first pulse changes electronic properties of the processed material.

42. The laser apparatus as claimed in claim 38, wherein the first pulse changes structural properties of the processed material.

43. The laser apparatus as claimed in claim 38, wherein the first pulse creates a heat affected zone in the processed material and the second pulse ablates at least a portion of the heat affected zone.

44. A laser apparatus for materials processing, wherein the laser apparatus applies bursts of laser light to a target area of a material at a predetermined repetition rate, the burst of laser light comprising at least first and second pulses of laser light displaced or overlapped in time, and wherein the first pulse emitted by the laser apparatus has a first pulse width and the second pulse emitted by the laser apparatus has a second pulse width, wherein predetermined parameters of the first pulse induce a change in a selected property of the material, and predetermined parameters of the second pulse interact with the property change induced by the first pulse, and only the second pulse is nonlinearly absorbed by the material, shorter, and wherein the first pulse emitted from the laser apparatus comprises sufficient amplified spontaneous emission to at least thermally heat the target area of the material.

45. The laser apparatus as claimed in claim 44, wherein the predetermined repetition rate is substantially equal to or greater than 100 kilohertz.

46. The laser apparatus as claimed in claim 44, wherein the predetermined parameters of the first pulse comprise pulse width, pulse energy, pulse wavelength and pulse polarization vector and the predetermined parameters of the second pulse comprise pulse width, pulse energy, pulse wavelength and pulse polarization vector.

47. The laser apparatus as claimed in claim 44, wherein the first pulse changes electronic properties of the processed material.

48. The laser apparatus as claimed in claim 44, wherein the first pulse changes structural properties of the processed material.

49. The laser apparatus as claimed in claim 44, wherein the first pulse creates a heat affected zone in the processed material and the second pulse ablates at least a portion of the heat affected zone.

50. A method of materials processing, wherein the method comprises applying bursts of laser light to a target area of a material at a predetermined repetition rate, the burst of laser light comprising at least first and second pulses of laser light displaced or overlapped in time, wherein the first pulse has a first pulse width and the second pulse has a second pulse width, and the first pulse width is greater than the second pulse width and greater than 10 ps in duration, the second pulse width being an ultrashort pulse with a pulse width being about 1 picosecond or shorter, wherein the first pulse further comprises amplified spontaneous emission (ASE) having sufficient energy to at least thermally heat the target area of the material.

51. The method of claim 50 wherein the first pulse provides a thermal machining mechanism.

52. The method of claim 50, wherein a wavelength of the amplified spontaneous emission is different than a wavelength of the second pulse.

53. The method of claim 52, further comprising: compressing a pulse width so as to produce the ultrashort pulse, and controlling a ratio of the energy in the first and second pulses, wherein compressing and controlling are carried out with a pulse compressor and a wavelength sensitive element disposed in the compressor.

54. A laser apparatus of materials processing, wherein the laser system applies bursts of laser light to a target area of a material at a predetermined repetition rate, the burst of laser light comprising at least first and second pulses of laser light displaced or overlapped in time, wherein the first pulse has a first pulse width and the second pulse has a second pulse width, and the first pulse width is greater than the second pulse width and greater than 10 ps in duration, the second pulse width being an ultrashort pulse, with a pulse width being about 1 picosecond or shorter, wherein the first pulse emitted from the laser apparatus further comprises amplified spontaneous emission (ASE) having sufficient energy to at least thermally heat the target area of the material.

55. The system of claim 54, wherein a wavelength of the amplified spontaneous emission is different than a wavelength of the ultrashort pulse.

56. The method of claim 55, wherein said apparatus further comprises a compressor to compress a pulse width so as to produce the ultrashort pulse, and a wavelength sensitive element disposed within the compressor to control a ratio of energy of the first and second pulses.

* * * * *